(12) United States Patent
Celina

(10) Patent No.: US 8,193,256 B1
(45) Date of Patent: Jun. 5, 2012

(54) METHOD FOR EPOXY FOAM PRODUCTION USING A LIQUID ANHYDRIDE

(75) Inventor: Mathias Celina, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 125 days.

(21) Appl. No.: 12/555,251

(22) Filed: Sep. 8, 2009

Related U.S. Application Data

(60) Provisional application No. 61/229,330, filed on Jul. 29, 2009.

(51) Int. Cl.
*C08J 9/08* (2006.01)
*C08J 9/00* (2006.01)
*C08J 9/04* (2006.01)

(52) U.S. Cl. ............ 521/94; 521/54; 521/135; 521/178; 521/181

(58) Field of Classification Search ........... 521/135, 521/178, 181, 54, 94
See application file for complete search history.

(56) References Cited

U.S. PATENT DOCUMENTS

| | | | |
|---|---|---|---|
| 4,256,868 A | 3/1981 | Tarasen | |
| 4,990,543 A | 2/1991 | Wernsing et al. | |
| 5,120,771 A | 6/1992 | Walmsley | |
| 5,407,966 A * | 4/1995 | Ebert et al. | 521/97 |
| 5,990,224 A | 11/1999 | Raynolds et al. | |
| 6,031,012 A | 2/2000 | Nakanishi et al. | |
| 6,110,982 A * | 8/2000 | Russick et al. | 521/54 |
| 6,825,315 B2 | 11/2004 | Aubert | |
| 2005/0025955 A1* | 2/2005 | Kuriu et al. | 428/304.4 |

OTHER PUBLICATIONS

Data Sheet from "LookChem" for Di-tert-butyl dicarbonate. LookChem.com.*
Data Sheet from "Chemical Book" for Di-tert-butyl dicarbonate. Chemicalbook.com.*
Celina M., Novel foaming processes using CO2 generation from anhydride precursors. Polymer Preprints (American Chemical Society, Division of Polymer Chemistry) 2008;49:767.
Celina, Mathew; Kropka, Jamie M.; Lisa A.; Rao, Rekha R.; Aubert, James H. Improved Foam Materials Through Characterization of Foam Stability; From PMSE Preprints (2009), 101, 873-875.

* cited by examiner

*Primary Examiner* — Randy Gulakowski
*Assistant Examiner* — Kara Boyle
(74) *Attorney, Agent, or Firm* — Elmer A. Klauetter; Kevin W. Bieg

(57) ABSTRACT

An epoxy resin mixture with at least one epoxy resin of between approximately 50 wt % and 100 wt %, an anhydride cure agent of between approximately 0 wt % and approximately 50 wt %, a tert-butoxycarbonyl anhydride foaming agent of between proximately 0.1-20 wt %, a surfactant and an imidazole or similar catalyst of less than approximately 2 wt %, where the resin mixture is formed from at least one epoxy resin with a 1-10 wt % tert-butoxycarbonyl anhydride compound and an imidazole catalyst at a temperature sufficient to keep the resin in a suitable viscosity range, the resin mixture reacting to form a foaming resin which in the presence of an epoxy curative can then be cured at a temperature greater than 50° C. to form an epoxy foam.

16 Claims, 2 Drawing Sheets

METHOD FOR EPOXY FOAM PRODUCTION USING A LIQUID ANHYDRIDE

RELATED APPLICATIONS

This application claims the benefit of U.S. Provisional Application No. 61/229,330, filed on Jul. 29, 2009.

This invention was made with Government support under Contract No. DE-AC04-94AL85000 awarded by the Department of Energy. The Government has certain rights in the invention.

BACKGROUND OF THE INVENTION

The invention relates to foamed epoxies, and more particularly, to foamed epoxies prepared using a liquid anhydride as a foaming agent in the presence of tertiary amine catalysts or similar strong nucleophilic catalysis.

Foamed epoxies are normally produced via addition of physical blowing agents such as inorganic compounds that thermally decompose at low temperatures and produce gases, or via addition of low volatile liquids, such as freons or similar fluorinert compounds, that also result in gas formation and expansion during the exothermic epoxy cure. In comparison, polyurethanes are commonly cured using an in-situ chemical side reaction that produces gaseous $CO_2$ during the cure reactions. This reaction is specific to the properties of isocyanates, the key molecular building block of polyurethanes, which form carbamic acids in the presence of water and then cleave off $CO_2$. Due to the completely different types of epoxy curing reactions, an in-situ chemical foaming process similar to the standard and widely used polyurethane foaming reactions and process has so far not been described in the literature.

DESCRIPTION OF SPECIFIC EMBODIMENTS

Figure 1:
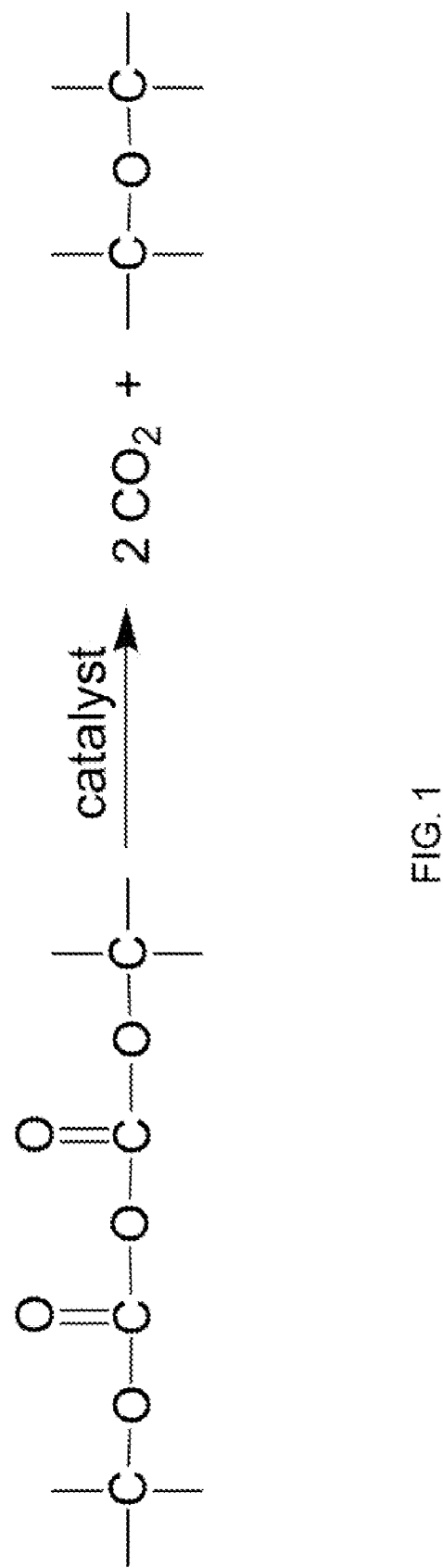
FIG. 1 shows the decomposition of polymerization scheme for tert-butoxycarbonyl anhydride, yielding $CO_2$ for foaming.

The present invention describes an alternative method for the production of foamed epoxy materials. Although foamed epoxies are normally produced using physical blowing agents such as inorganic compounds that thermally decompose at low temperatures and produce gases, or via addition of low volatile liquids, such as freons or similar flourinert compounds, that also result in gas formation and subsequent expansion during the exothermic epoxy cure, the method of the present invention utilizes an anhydride additive, in particular tert-butoxycarbonyl anhydride (BOC) as a liquid foaming agent. Under suitable catalytic conditions BOC can be triggered to decompose and yield large quantities of $CO_2$ for resin expansion. Similarly to carbamic acids formed from isocyanates and water in polyurethanes, a nucleophilic opening or attack on the anhydride structure in BOC will yield intermediates that have a tendency to cleave off gaseous $CO_2$ (see FIG. 1). Tert-butoxycarbonyl anhydride (BOC) in itself is not an attractive epoxy curing agent, due to its instability (decomposition tendencies) and a lack of multifunctional reactivity. The primary function of BOC as an additive to curable epoxy resin mixes is the generation of $CO_2$ for foaming purposes. The BOC decomposition reactions which produce gaseous $CO_2$ as a by-product occur from room temperature to elevated temperatures of 100° C. or higher. At room temperature, foams can be made this way that resemble fine-celled shaving foam, but cure reactions might be too slow to solidify the foam into a rigid material prior to the beginning of foam coalescence due to a limited lifetime.

Figure 2:
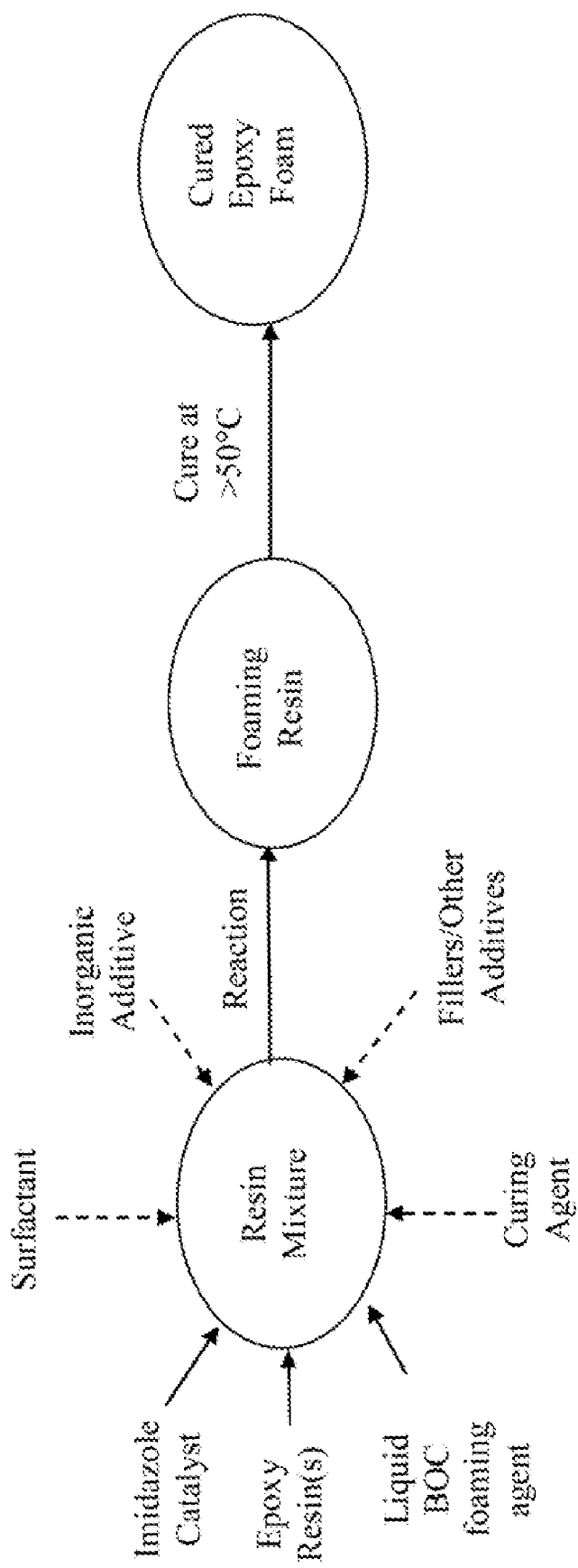
FIG. 2 illustrates the general method of the present invention.

FIG. 2 illustrates one general embodiment of the method of the present invention wherein a resin mixture is formed by adding at least one epoxy resin with the BOC compound and a simple imidazole catalyst at a temperature sufficiently high to have the epoxy resin within a suitable viscosity range attractive to resin mixing. BOC has a melting point of approximately 25-35° C., meaning a slightly warm liquid of BOC can be easily added. The mixture constituents react to form a foaming resin which in the presence of additional suitable curatives can subsequently be cured to form an epoxy foam. For the method of the present invention, BOC is tert-butoxycarbonyl anhydride, also called di-tert-butyl dicarbonate, di-tert-butyl pyrocarbonate, or BOC anhydride and is used in the purity that is normally commercially available. For the method of the present invention, in one embodiment, the imidazole catalyst is an imidazole compound with a substitution group on the tertiary nitrogen (that is, the hydrogen must be substituted with a methyl or other similar group). In one embodiment, the catalyst is 1-methyl imidazole. Other additives can be optionally added to control the reaction process as well as physical and chemical properties of the resulting foam. Traditional surfactants are used as additives to enable controlled and homogenous foam formation and cell size, as well as initial foam stability. Curing agents can be added as well as compounds to control the viscosity of the mixture or physical properties of the resultant foam. This BOC anhydride-based foaming process can also be conducted in the presence of other additives and compounds, resulting in foamed hybrid materials.

The present invention also provides for a resin mixture composition prior to curing as an epoxy foam comprising at least one epoxy resin of between approximately 50 wt % and 90 wt %, a suitable anhydride epoxy curative of between approximately 0 wt % and approximately 50 wt %, the BOC foaming agent of between approximately 0.1 wt % and less than 20 wt %, a suitable surfactant of approximately 1%, and an imidazole catalyst of less than approximately 2 wt %.

In one embodiment, various epoxy resins and epoxy systems with traditional curing agents (such as commonly used phthalic anhydrides and their derivatives) were polymerized with low amounts of nucleophilic initiators (anionic cure) and surfactants in the presence of BOC anhydride at temperatures from room temperature to 100° C. The BOC anhydride produced sufficient $CO_2$ quickly enough to yield a rapidly expanding fine-celled epoxy foam of sufficient stability to cure into a foamed material. The resulting cured glassy materials are chemically foamed epoxies with a large range of physical densities available, depending on concentrations of epoxy and curative, BOC, initiators, surfactants and reaction temperatures. Excellent foams can be obtained at very reasonable curing temperatures of 50-80° C.

A catalyst is added to initiate the decomposition of BOC for rapid $CO_2$ generation during the early soft stage of the foam. The catalyst simultaneously also initiates polymerization of the epoxy resin and the cure of the epoxy with extra anhydride-based curatives, like in traditional epoxy-anhydride systems. The latter reactions will lead to an increase in molecular weight and resin solidification. Mechanical properties and foam densities can be easily varied and adjusted as a function of the basic resin viscosity and functionality, nature and amount of curatives, and BOC anhydride addition as well as catalytic levels and pre-warm/cure temperature affecting foaming and cure kinetics.

In one embodiment of the method of the present invention, an epoxy base resin of suitable viscosity to allow for mixing and initial foam stability is mixed with BOC anhydride at a temperature sufficient to allow mixing (that is, a temperature sufficient to make the BOC anhydride molten, i.e. greater than 35° C.) to make a warmed resin mixture. A catalyst comprising an imidazole compound, other tert amine or derivative thereof can be added either during this mixing process while the mixture is pre-warmed or after cooling down the resin mixture. In the absence of any further curatives and at low temperatures, i.e. room temperature, a fine-celled non-curable foam can be obtained, that allows for fundamental foam stability studies without the interference of parallel curing reactions. After addition of a curative to the resin mix, prior to adding the catalyst, a curable mixture is obtained that is foamable and will yield a solid cured epoxy foam when cured at an elevated temperature.

Tert-butoxycarbonyl anhydride (BOC) is unique in its structure as a complex anhydride, as it combines an anhydride with a double ester structure (based on tert butanol as the alcohol). The molecule is often used for introducing a substituted acetyl protective group (here tert butoxy-acetyl) in organic chemistry on susceptible nitrogens or oxygens. However, BOC is also rich in $CO_2$ containing structural units and after nucleophilic opening of the anhydride can easily eliminate two units of $CO_2$ per molecule. In the present invention this behavior is optimized to yield rapid $CO_2$ generation via suitable catalysis. BOC anhydride has been used with a concentration of between 0.1% and not more than 20 wt % in the method of the present invention to form nicely expanded cured epoxy foams.

In one embodiment, the BOC based foaming reaction is coupled with curable epoxy or other suitable reactive and curable resin mixes to result in the production of solid cured foams of varying density. As an advantage of using BOC anhydride, which on its own is not an agent participating in the resin cure, the gas generation and foaming process is completely decoupled from the polymerization or curing of the epoxy resin mixture. This behavior is quite different to the early gelation contribution of multifunctional isocyanate reagents in polyurethane foams via amine isocyanate reactions after $CO_2$ cleavage. In some foam formulations, it is highly beneficial to have the foaming reaction decoupled from any curing process. Since the foaming can also be conducted at room temperature, it is possible to independently foam and cure within different temperature regimes.

Epoxy foams are formed by cross-linking reactions between epoxy resins and curing agents that create a three-dimensional covalent bond polymer network. There are numerous commercially available epoxy resins and curing agents that are used to prepare epoxy foams with varying thermal, mechanical, and electrical properties. A type of epoxy resin that is commonly used is diglycidyl ether of bisphenol A (DGEBA); another common type of epoxy resin is a phenolic novolac based epoxy material. In general, these are cured with various amines and in higher performance materials with aromatic or aliphatic acid anhydrides. Examples of these are: the solid Epon 1001, Epon 1002, Epon 1004, Epon 1007, Epon 1009, Epon 1031 and Epon SU-8; and the liquid, Epon 160, Epon 161, Epon 154, Epon 826, Epon 828, Epon 830, Epon SU-2.5, Epon SU-3 manufactured by Hexion (previously Shell Chemical Corporation); and EN439, DER331, and similar materials manufactured by Dow Chemical. Other materials may be Epalloy® and Erisys® epoxies from the CVC Specialty Chemicals, Inc. resin company and pure Araldite® epoxy resins (Huntsman Corporation advanced materials). Also, the following epoxy resins may be used: the solid ERL-2002, 2003 and 3001 and the liquid ERL 2772, 2774 and 3794 manufactured by Bakelite Co. of the Union Carbide Plastics Division. Any epoxy resin that is comparable to the above listed epoxy resins may be used regardless of the manufacturer. Resins can be easily mixed to result in a suitable viscosity and reactivity range (epoxy equivalent reactivity by resin weight value).

Acid anhydride curing agents commonly used are tetrahydro phthalic anhydride (THPA), methyl-tetrahydro phthalic anhydride (MTHPA), hexahydro phthalic anhydride (HHPA), methyl-hexahydro phthalic anhydride (MHHPA), nadic methyl anhydride (NA), phthalic anhydride (PA) or derivatives like methylphthalic anhydride (MPA) and can be added as desired, generally at concentrations less than 1:1 wt % with the epoxy resin. Also higher melting point aromatic acid anhydrides like benzophenonetetracarboxylic dianhydride (BTDA), pyromellitic acid anhydride, or similar compounds can be used as cure agents. Low molecular weight aliphatic anhydrides are less commonly used. Maleic anhydride has also been used as a partial cure additive or cure agent.

Surfactants are used in epoxy foams to promote foaming and stabilization of the subsequent cellular structure. A surfactant generally serves to decrease the surface tension of the pre-cure composition and thereby promote increased expansion, smaller cells, and more uniform cell size and texture of the expanded formed product. The surfactants used in polyurethane foam systems, such as silicone-based surfactants, are the same ones generally used in epoxy foams. The cell structure can be greatly affected by the surfactant, which in turn influences the properties of the resultant foam.

In various embodiments, anionic, cationic and non-ionic types of surfactants can be used, with the latter being the more commonly applied compounds in organic foams. Of hundreds of available commercial surfactants, many surfactants will foam well during early rise of the foam but for extended cure times can lead to foam contraction or even foam collapse as they can commence partially acting as defoamers. In another embodiment, even without a surfactant, some suitable foams can be obtained. Their structure will in general be coarser than those foams produced with a surfactant. Finer cells can be achieved with the help of surfactants. Many non-ionic based surfactants and some types normally used in polyurethane foams were evaluated and work in the foam system of the present invention. Suitable surfactants, include but are not limited to, Air Products DC 5906, Air Products DC193, Air Products DC 5598, Air Products DC 5577, Air Products LK 221 (all are organo polysiloxane); less attractive are Shin-Etsu KF-105 (modified organo polysiloxane), Stepan G3300 (amine alkylbenzene sulfonate), Cedepal CO-210 (alkyl phenol ethoxylate), or Polystep F-5 (>95% nonionic alkoxylate-polyethylene glycol mono(nonyl phenyl)ether. Some are silicone based or poly ethyleneoxide block non-ionic surfactants. A variety of surfactants can be used to provide sufficient performance, generally added at a concentration of less than approximately 2 wt %.

In principle most tertiary amines, aliphatic or aromatic based will accelerate many types of epoxy cure reactions. This is one reason that epoxy amine systems are generally the fastest curable epoxy systems. An epoxy anhydride system can be accelerated and efficiently cured with for example a low concentration of dimethyloctylamine, piperazine, imidazole derivatives or with many other amines possessing polymerization initiating nucleophilic character. It was initially assumed that BOC anhydride could be triggered easily to produce $CO_2$ using many similar amines. However, for the BOC anhydride dissolved in an epoxy resin with anhydride curatives, most amines will exclusively accelerate the acid anhydride based cure with the epoxy; most amines trigger the classic reaction to form a crosslinked polyester (the addition product of epoxy groups to acid anhydrides) as proceeding in every acid anhydride epoxy formulation. Nearly all of the common amine catalysts examined failed to induce the rapid BOC anhydride decomposition with a high yield of $CO_2$ generation that is part of the method of the present invention; perhaps one reason that this approach has so far not been described in the literature. The company Air Products specializes in the marketing of various foaming catalysts, predominantly amine based and supplied to foam manufacturing as a full range of mostly polyurethane foaming and crosslinking catalysts. Many commercial catalysts such as DABCO T-12, DABCO TMR, DABCO TMR-3, POLYCAT SA-102, DABCO T12, POLYCAT 26, DABCO MB20, POLYCAT 41, DABCO Crystalline, DABCO BL-17, DABCO BL-19, DABCO 33 LV, or CUREZOL 2E4MZ are available and are commonly used in quantities of approximately 1%. Most of these catalysts will accelerate the epoxy anhydride cure but fail to produce rapid $CO_2$ production for a foaming process using the BOC anhydride.

Testing showed that 1-methyl imidazole which is a tertiary amine catalyst, or DABCO 33 LV are uniquely suited in their effectiveness to catalyze the BOC anhydride decomposition to produce $CO_2$ within a few minutes for foaming purposes and also accelerate the matrix resin cure. This is apparently related to the small size of these molecules, not just their basicity, but their strong hard nucleophilic character of the nitrogen free electron pair. Other catalysts exist that display strong nucleophilic character in a highly mobile small molecule with an exposed unbonded nitrogen electron pair and include N-substituted pyrimidines. Similarly, crown ethers with dissolved alkali hydroxides possess free OK that may be an attractive nucleophile. Interestingly, even related imidazole derivatives like 2-ethyl 4-methyl imidazole did not act as suitable catalysts, likely because of the non-substituted 1-nitrogen. It appears that at minimum the 1-nitrogen in the imidazole or in the LV33 must be hydrogen free; that is methyl substituted or similar. Indications are that any available hydrogen transfer reaction can interfere with the BOC anhydride decomposition, thereby preventing $CO_2$ elimination.

In another embodiment, the basic epoxy foam can be modified with the addition of various curable anhydrides (commonly used are tetrahydro phthalic anhydride (THPA), methyl-tetrahydro phthalic anhydride (MTHPA), hexahydro phthalic anhydride (HHPA), methyl-hexahydro phthalic anhydride (MHHPA), nadic methyl anhydride (NA), phthalic anhydride (PA) or derivatives like methylphthalic anhydride (MPA)) to achieve variations in toughness and other mechanical properties. Similarly, other reactive resins such as cyanate esters or isocyanates can be added to help in further crosslinking and hybrid cure network formation. Such reactive compounds will affect viscosity and cure features. Inorganic additives using clays, wollastonite, mica and the whole range of commonly-used fillers can be incorporated, again with the aim of tuning mechanical properties, hardness, char behavior, thermal properties or related features. The limits to this system is found in any amine based epoxy curatives, as anhydrides and amines will quickly react to form amides/imides and water and are therefore unsuitable to be used in the method of the present invention.

In one embodiment, an epoxy base resin of suitable viscosity to allow for mixing and initial foam stability is mixed with approximately 1-10% of BOC anhydride at a temperature sufficient to allow mixing (that is, at a temperature sufficiently high to keep the BOC anhydride molten, such as above 35° C.) and also mixed with a catalyst with optionally 0-2% of a suitable surfactant added to promote a finer, more stable, foam structure. One catalyst material is comprised of 1-methyl imidazole or LV33 slightly diluted with water. When the catalyst is mixed, $CO_2$ will evolve and foam the resin. Lacking an epoxy curative, this foam formulation will rise but won't cure rapidly at elevated temperature, generally in the range of 50-100° C. Such non-curable foams are of interest in foam mold flow and foam stability studies.

In one embodiment, 100 parts of the epoxy resin Dow 439 was mixed with 75 pph methyltetrahydro phthalic anhydride (the curative) as a warm liquid with the addition of 0.5% silicone-based surfactant such as DC 193 (manufactured by Air Products). Approximately 0.5-2% of 1-methyl imidazole or LV33 was added as a catalyst and the resulting rising foam put in an oven and cured at 75° C.

EXAMPLES

In all of the examples and embodiments presented herein, the temperatures and concentrations are approximate, rounded to the nearest significant figure.

Example 1

Non-Curable Foamed Epoxy Resin

In one embodiment, 100 parts of Epon 161 was added with 5% BOC anhydride. In this embodiment, room temperature was maintained. 0.5% silicone-based surfactant such as DC 193 (manufactured by Air Products) and 1 pph of 1-methyl imidazole catalyst was added. A foaming resin of non-curable nature and good flow was produced. In another embodiment, 100 parts of Epon 828 or Epon 160 were used.

Example 2

Foamed Epoxy with Basic Cure

In one embodiment, 100 parts of Dow 439 was preheated to 75° C. and added to 75 pph (parts per total resin mixture) of methyltetrahydro phthalic anhydride where the anhydride curative was maintained as a warm liquid. In this embodiment, a temperature of 65° C. was maintained. 5% BOC anhydride was added as the foaming agent. 0.5% silicone-based surfactant such as DC 193 (manufactured by Air Products) and 1 pph of 1-methyl imidazole catalyst was added. A foaming resin was produced and cured at 75° C. for approximately 24 hrs.

Example 3

Foamed Epoxy with Different Resin and Catalyst

In one embodiment, 100 parts of Epon 154 was preheated to 65° C. and added to 75 pph (parts per total resin mixture) of methyltetrahydro phthalic anhydride where the anhydride curative was maintained as a warm liquid. In this embodiment, a temperature of 65° C. was maintained. 5% BOC anhydride was added as the foaming agent. 0.5% of a silicone-based surfactant, such as DC 193 (manufactured by Air Products) and 1 pph of slightly diluted LV33 catalyst was added. A foaming resin with coarser cells (due to lower viscosity of Epon 154) was produced and cured at 65° C. for approximately 24 hrs. In another embodiment, 100 parts of Epon 1050 were used.

Example 4

Foamed Epoxy with a Mix of Different Epoxy Resins

In one embodiment, 50 parts of Dow 439 and 50 parts of Epon 154 was preheated to 75° C. and added to 75 pph (parts per total resin mixture) of hexahydro phthalic anhydride where the anhydride curative was maintained as a warm liquid. In this embodiment, a temperature of 65° C. was maintained. 2.5% BOC anhydride was added as the foaming agent. 0.5% of a silicone-based surfactant, such as DC 193 (manufactured by Air Products) and 1 pph of 1-methyl imidazole was added. A foaming resin was produced and cured at 65° C. for approximately 24 hrs. In another embodiment, 50 parts of Epon 1050 were used instead of Epon 154.

Example 5

Foamed Epoxy with an Epoxy Modifier

In one embodiment, 100 parts of Dow 439 was preheated to 75° C. and added to 75 pph (parts per total resin mixture) of methyltetrahydro phthalic anhydride where the anhydride curative was maintained as a warm liquid. 10 pph Hexion epoxy modifier Neloxy 62 (a viscosity reducer) was added. In this embodiment, a temperature of 65° C. was maintained. 7% BOC anhydride was added as the foaming agent. 0.5% silicone-based surfactant such as DC 193 (manufactured by Air Products) and 1 pph of 1-methyl imidazole catalyst was added. A foaming resin was produced and cured at 75° C. for approximately 24 hrs.

Example 6

Foamed Epoxy with Additives

In one embodiment, 100 parts of Epon 154 was preheated to 65° C. and added to 75 pph (parts per total resin mixture) of methyltetrahydro phthalic anhydride where the anhydride curative was maintained as a warm liquid. In this embodiment, a temperature of 65° C. was maintained. 50 pph Vanderbilt Peerless kaolin clay was added as a filler, 5% BOC anhydride was added as the foaming agent. 0.5% of a silicone-based surfactant, such as DC 193 (manufactured by Air Products) and 1 pph of slightly diluted LV33 catalyst was added. A foaming resin was produced and cured at 65° C. for approximately 24 hrs. In another embodiment, 50 parts of Wollastonite filler were used.

Example 6

Foamed Epoxy with no Additives and 2 pph Catalyst

In one embodiment, 100 parts of Epon 154 was preheated to 65° C. and added to 75 pph (parts per total resin mixture) of methyltetrahydro phthalic anhydride where the anhydride curative was maintained as a warm liquid. In this embodiment, a temperature of 65° C. was maintained. 5% BOC anhydride was added as the foaming agent. 0.5% of a silicone-based surfactant, such as DC 193 (manufactured by Air Products) and 2 pph of 1-methyl imidazole catalyst was added. A foaming resin was produced but, because of the increased concentration of some of the reactants, the mixture over-reacted. In another embodiment, 100 parts of Epon 1050 were used.

Example 7

Foamed Epoxy with No Additives and Low Viscosity Resin

In one embodiment, 100 parts of Epon 828 was added to 75 pph (parts per total resin mixture) of methyltetrahydro phthalic anhydride at room temperature. In this embodiment, a temperature of 40° C. was then maintained for the resin mix. 5% BOC anhydride was added as the foaming agent. 0.5% of a silicone-based surfactant, such as DC 193 (manufactured by Air Products) and 1 pph of 1-methyl imidazole catalyst was added. A foaming resin was produced but, because of the reduced viscosity of the reactants mix, the mixture essentially boiled and did not rise to yield a well-developed foam. In another embodiment, 100 parts of Epon 826 or Erisys GA 240 were used.

Although the invention has been described with reference to one or more particular embodiments, this description is not meant to be construed in a limiting sense. Various modifications of the disclosed embodiments as well as alternative embodiments of the invention will become apparent to persons skilled in the art. It is therefore contemplated that the appended claims will cover any such modification or embodiments that fall within the scope of the invention. The entire disclosures of all references, applications, patents and publications cited above are hereby incorporated by reference.

I claim:

1. A method of making an epoxy foam, comprising forming a resin mixture of at least one epoxy resin with a 0.1-20 wt % tert-butoxycarbonyl anhydride compound and an imidazole catalyst at a temperature sufficient to keep said resin mixture reacting to form a foaming resin, thereby making an epoxy foam.

2. The method of claim 1 wherein said imidazole catalyst is 1-methyl imidazole.

3. The method of claim 1 wherein a surfactant is added in forming said resin mixture.

4. The method of claim 1 wherein said imidazole catalyst is added at a concentration of between approximately 0.3 wt % and approximately 2 wt %.

5. The method of claim 1 wherein said at least one epoxy resin is selected from the group consisting of a diglycidyl ether of bisphenol A compound, a phenolic novolac compound, and a phthalic acid derivative based epoxy cure agent.

6. The method of claim 1 wherein said at least one epoxy resin is selected from a resin with a terminal reactive epoxy group.

7. The method of claim 3 wherein said surfactant is added at a concentration less than approximately 2 wt %.

8. The method of claim 3 wherein said surfactant is selected from the group consisting of an anionic surfactant, a cationic surfactant and a non-ionic surfactant.

9. The method of claim 3 wherein said surfactant is selected from an organo polysiloxane compound, an amine alkylbenzene sulfonate compound, an alkyl phenol ethoxylate compound, a silicone-based non-ionic compound, a poly ethyleneoxide block non-ionic compound, and a nonionic alkoxylate-polyethylene glycol mono(nonyl phenyl)ether compound.

10. The method of claim 1 wherein a curing agent is added to said resin mixture.

11. The method of claim 10 wherein said curing agent is added at a concentration less than approximately 100 wt %.

12. The method of claim 10 wherein said curing agent is selected from tetrahydro phthalic anhydride, methyl-tetrahydro phthalic anhydride, hexahydro phthalic anhydride, methyl-hexahydro phthalic anhydride, nadic methyl anhydride, phthalic anhydride, methylphthalic anhydride, benzophenonetetracarboxylic dianhydride, and pyromellitic acid anhydride, or similar anhydrides.

13. The method of claim 1 wherein an inorganic additive is added to said resin mixture to control a property selected from a mechanical property, foam hardness, foam char behavior and foam thermal property.

14. The method of claim 13 wherein said inorganic additive is selected from a clay, wollastonite, and mica.

15. A method of making an epoxy foam, comprising:
forming a resin mixture of at least one epoxy resin with 10-100 pph anhydride epoxy cure agent, 0.1-20 wt % tert-butoxycarbonyl anhydride compound, a surfactant and an imidazole catalyst at a temperature sufficient to keep said resin mixture reacting to form a foaming resin; and curing said foaming resin at a temperature greater than 50° C. to form an epoxy foam.

16. The method of claim 1, wherein the temperature is less than 100° C.

* * * * *